May 5, 1970  H. FLEISSNER  3,509,607
APPARATUS FOR THE CREASE-FREE HEAT-TREATMENT OF
LENGTHS OF TEXTILE MATERIALS
Filed Oct. 30, 1967

Inventor:
HEINZ FLEISSNER

BY: Craig & Antonelli
ATTORNEYS

United States Patent Office 3,509,607
Patented May 5, 1970

3,509,607
APPARATUS FOR THE CREASE-FREE HEAT-TREATMENT OF LENGTHS OF TEXTILE MATERIALS
Heinz Fleissner, Egelsbach, near Frankfurt am Main, Germany, assignor to VEPA AG, Basel, Switzerland
Filed Oct. 30, 1967, Ser. No. 679,047
Claims priority, application Germany, Nov. 3, 1966, V 32,251
Int. Cl. D06c *3/06*
U.S. Cl. 26—68      14 Claims

ABSTRACT OF THE DISCLOSURE

An apparatus for introducing one or more lengths of variable width material into a heat-treatment chamber wherein a cloth guide means and a spreading device are advantageously provided at the inlet of the treatment chamber. The cloth guide means and the spreading device can be optionally used for treating one material length or several material lengths, preferably for treating two material lengths disposed in a side by side relationship.

BACKGROUND OF THE INVENTION

The present invention relates to an apparatus for the crease-free heat-treatment of lengths of textile materials, such as knitted and woven fabrics, non-wovens, etc., with a treatment medium such as air, gas, steam or a mixture of these media. The material to be treated is introduced into a treatment chamber which contains cylindrical conveying elements, preferably sieve drums subjected to a suction draft, for guiding the material to be treated. A cloth guide as well as a spreading device is advantageously provided at the inlet of the treatment chamber.

Devices for drying, steaming, Thermosol-dyeing, heat-setting and curing fabrics and other lengths of textile materials as well known. An especially gentle and crease-free material guidance can be realized by using an apparatus containing sieve drums subjected to a suction draft as the conveying elements. In this apparatus it is also possible to guide, without any substantial tension, textile materials which exhibit a high degree of shrinkage by overfeeding the material to the sieve drums in an amount sufficient to compensate for the material shrinkage. In one of the known devices a pair of rollers is correlated to the first sieve drum subjected to a suction draft for achieving this purpose. In the treatment chamber one or several sieved drums may be provided for material guidance and may be arranged in one or two rows. As a result of a partial vacuum created in the sieve drums, the material being treated is safely and securely held to the sieve drum jacket. These portions of the sieve drums which are not covered with the material being treated are advantageously sealed off from the suction draft by means of baffles which are disposed in the sieve drums. The baffles are designed and arranged in such a way that the suction draft of the one sieve drum is interrupted where the suction draft of the following sieve drum begins so that the material is passed automatically from one sieve drum to the following sieve drum. However, instead of the sieve drums, rollers may also be provided which are designed as guide rollers and which may be heated in order to effect and/or intensify the heat-treatment of the material in this way. With sieve drums subjected to a suction draft the treatment medium is drawn through the material. However, devices are also well known in which the material is only jetted by the treatment medium.

A disadvantage of the known devices is that they are designed for a certain working width, that is for the widest material length which is handled by the particular mill. With narrower material lengths the device is only partially utilized. Thus, when using sieve drums subjected to a suction draft a substantial amount of the treatment medium circulated in the treatment chamber is drawn through the sieve drums without coming into contact with the textile material being treated. Thus, the suction draft which is produced preferably by means of fans which are correlated to the faces of the sieve drums is not fully utilized. In this case, the fan capacity serves only partially for the treatment, for example for drying. In an attempt to deal with this problem it has already been suggested to seal the free area of the sieve drums, for example by means of sleeves. However, changing the sleeves to correspond to the particular working width of the material being treated requires a certain amount of time for mounting and removing the sleeves. Similar difficulties are encountered with device in which the material is jetted.

SUMMARY OF THE INVENTION

An object of the present invention is to avoid the prior art disadvantages in the crease-free, heat-treatment of various lengths and various widths of textile materials.

Another object of the present invention is to provide an improved apparatus which can effectively handle materials with varying widths and with the highest possible economy.

Other objects and further scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from the detailed description.

Pursuant to the present invention, it has been found that the above-mentioned disadvantages may be eliminated and a much improved apparatus for the treatment of varying widths of textile materials can be obtained if the apparatus can be operated with one or with several material lengths, advantageously two material lengths disposed in a side by side relationship. According to the present invention the feeding elements at the inlet of the apparatus are designed in such as say that they can be optionally used for one or for two material lengths. For achieving a crease-free treatment such feeding units are an absolute necessity. According to the present invention, an apparatus comprising a treatment chamber containing as conveying elements sieve drums subjected to a suction draft is provided with a feeding creel with stationary and/or rotating rollers, a cloth guide and, if possible, a spreading device disposed directly in front of the inlet rollers to the treatment chamber.

According to the present invention the textile material is freely guided in front of the inlet of the apparatus over a distance of preferably about one meter in length and guided laterally by means of a cloth guide which can be suitably used for one material length or for two material lengths. Spreading elements, preferably expander rolls are provided one behind the other and/or one above the other so that one expander roll is used for one material length and the other expander roll and/or or rolls for two material lengths. As cloth guides, guiding elements which engage the edges of the material width, for example pairs of rollers which are arranged obliquely to the direction of material passage and which are designed for two material lengths which are conveyed through the apparatus in a side by side relationship, can be effectively used. In order to also render it possible to handle only one material length with these cloth guides, it is suggested to support the two center guiding elements, for example pairs of rollers, in such a way that they can be swivelled outwards so that in the case of a wide material length only the outer pairs of guide rollers are employed. Thus with this apparatus it is possible to handle either one wide material length or two narrow material lengths in a side by side relationship. The small free area between the two material lengths has no substantial detrimental effects on the treatment process. As can be readily seen it is also possible to design the inlet to the apparatus so as to accommodate three material lengths. By the simultaneous treatment of several narrow material lengths, apparatus with large working widths can be more fully utilized.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
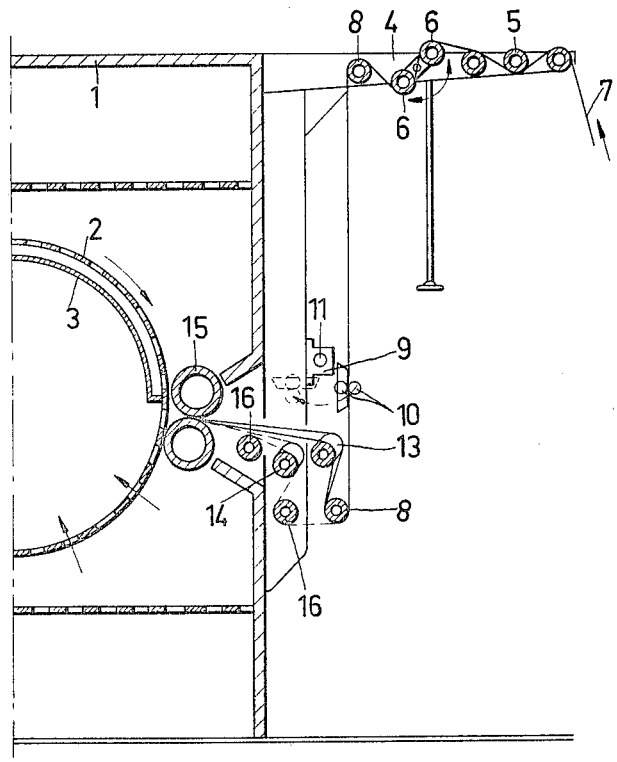
FIGURE 1 is a longitudinal section of the inlet of the treatment apparatus.
Figure 2:
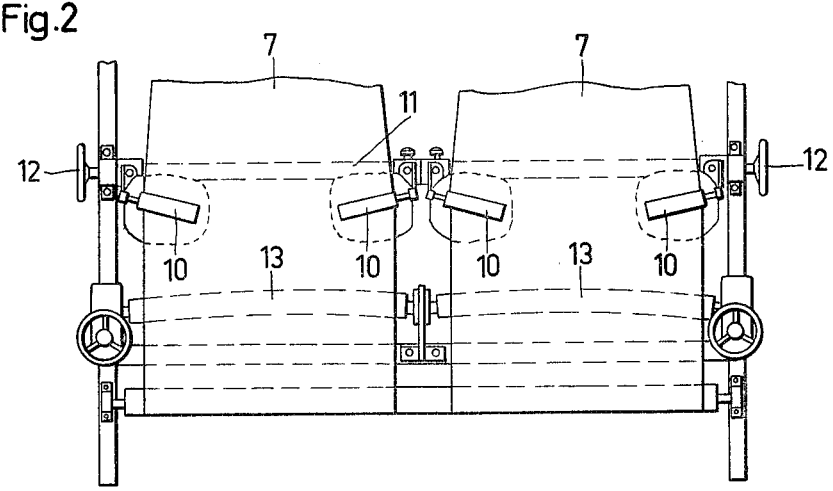
FIGURE 2 is a plan view of the units arranged in front of the inlet to the apparatus and FIGURE 2a is a plan view similar to FIGURE 2 but illustrating a modification thereof.
Figure 2A:
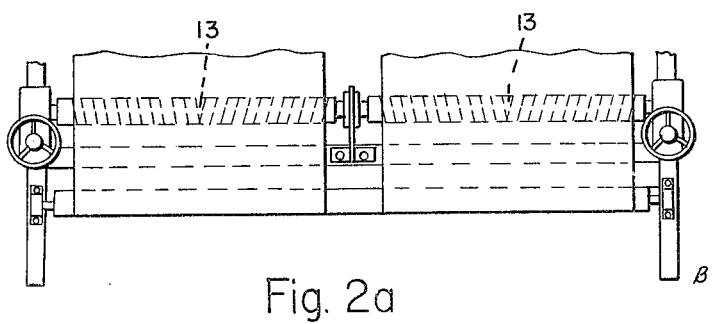

Referring now to the drawings wherein like reference numerals are used throughout the various views to designate like parts, the apparatus of the present invention comprises a heat-insulated housing 1 which contains one or more sieve drums 2 subjected to a suction draft. In each sieve drum the suction draft is interrupted by a baffle means 3 at that portion of the sieve drum which is not covered with the material being treated. At the inlet, the apparatus is provided with a creel 4 with stationary rollers 5 as well as a swivel mounted pair of rollers 6 which do not rotate, and which set the desired tension on the material. The material 7 is then guided vertically downward over an extended path. Adjoining guide rollers 8 are preferably pivoted. A material displacement of the material over the free distance from the creel to the expander rollers and guide rollers at the inlet of the apparatus is prevented by means of a cloth guide 9 which is provided with a pair of guide rollers 10 which are arranged obliquely to the direction of material passage. These pairs of rollers are supported by a carrier 11 and they can be displaced on the carrier 11 by means of hand wheels 12 to adapt them to different working widths. The two center pairs of rollers 10 are supported on the carrier swivel and can be swivelled outwards. The outer position is shown by the dashed line. According to the present invention bent expander rollers 13 and 14 are provided as a spreading device. Instead of bent expander rollers, rollers with expander spirals from the center to the two sides can also be used as well as other well known expander elements. For handling two material lengths, two bent expander rollers 13 are provided in a side by side relationship over which the two material lengths 7 are guided before they reach a pair of inlet rollers 15. If the apparatus is operated with one wide material length, the material length is passed over the expander roller 14 which extends over the whole working width and which is arranged behind expander rollers 13, as shown by the dashed line in FIGURE 1. In order to facilitate matters the expander roller 14 is not shown in FIGURE 2. The material length 7 can be passed directly from roller 8 to the expander roller 14 and then to the pair of inlet rollers 15 or as shown in FIGURE 1, via two additional rollers 16.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An apparatus for the introduction of one or more lengths of variable width material into a heat-treatment chamber containing cylindrical conveying means which comprises a creel means, a plurality of stationary mounted roller means and swivel-mounted roller means attached to said creel means, cloth guide means disposed after the creel means, said cloth guide means being suitable for handling at least one length of material, spreading means provided after the cloth guide means and disposed in succession, one spreading means accommodating one material length and the other spreading means accommodating at least two material lengths whereby one material length or at least two material lengths can be selectively conveyed to the treatment chamber and means for introducing the material length into the treatment chamber.

2. The apparatus of claim 1 wherein the creel means extends away from the treatment chamber near the inlet to said treatment chamber.

3. The apparatus of claim 1 wherein the cloth guide means comprises pairs of guide rollers which engage both sides of the material length at its edges.

4. The apparatus of claim 3 wherein the pairs of roller means are arranged obliquely to the direction of material passage.

5. The apparatus of claim 1 wherein the cloth guide means are provided for treating two material lengths in a side by side relationship, said cloth guide means comprising two center pairs of roller means and two outer pairs of roller means which engage the inner and outer edges of the two lengths respectively.

6. The apparatus of claim 5 wherein the pairs of roller means are arranged obliquely to the direction of material passage.

7. The apparatus of claim 5 wherein the two center pairs of rollers can be swivelled outwards when handling only one material length.

8. The apparatus of claim 1 wherein the cloth guide means are supported on a carrier means and can be displaced in the carrier means by hand wheel means to adapt them to different working widths.

9. The apparatus of claim 1 wherein the spreading means are bent expander rollers.

10. The apparatus of claim 1 wherein the spreading means are rollers with expander spirals which extend from the center to the two sides of said rollers.

11. The apparatus of claim 1 wherein inlet roller means are provided for introducing the material length into the treatment chamber.

12. The apparatus of claim 1, wherein said other spreading means comprises two expander rollers disposed in a side by side relationship.

13. An apparatus for the introduction of one or more lengths of variable width material into a heat-treatment chamber containing sieve drum means which comprises in combination a creel means associated with the treatment chamber, said creel means containing attached thereto a plurality of stationary mounted roller means and a pair of swivel-mounted non-rotatable roller means, said swivel-mounted roller means providing the desired tension on the material length, cloth guide roller means adapted to engage at least one material length at its edges, expander roller means disposed one behind the other, one expander roller means accommodating one material length and the other expander roller means accommodating at least two material lengths whereby one material length or at least two material lengths can be selectively conveyed to the treatment chamber, and means for introducing the material length into the treatment chamber.

14. The apparatus of claim 13 wherein guide roller means are associated with the expander roller means for facilitating the conveyance of the material to and from said expander roller means.

References Cited
UNITED STATES PATENTS

| | | | |
|---|---|---|---|
| 829,805 | 8/1906 | Sackville | 26—63 |
| 1,169,118 | 1/1916 | Brehmer. | |
| 1,591,906 | 7/1926 | Wood et al. | 26—66 |
| 2,343,328 | 3/1944 | Robertson et al. | 26—51.5 |
| 2,510,313 | 6/1950 | Houth et al. | 26—51 XR |
| 3,028,682 | 4/1962 | Fleissner | 34—120 XR |

FOREIGN PATENTS

| | | |
|---|---|---|
| 14,604 | of 1904 | Great Britain. |
| 23,603 | of 1912 | Great Britain. |
| 352,670 | 7/1931 | Great Britain. |
| 423,607 | 2/1935 | Great Britain. |

OTHER REFERENCES

"The Easiest Way To Get Rid of Bows or Skews or Both," 1956, Mount Hope Machinery Co.

"Mount Hope Weft Straighteners," Mount Hope Machinery Co.; Taunton, Mass.; pp. 8, 9, and 12 necessary.

ROBERT R. MACKEY, Primary Examiner

U.S. Cl. X.R.

26—63, 65; 34—120